(12) United States Patent
Wu et al.

(10) Patent No.: US 10,744,522 B2
(45) Date of Patent: Aug. 18, 2020

(54) FLOW RATE CONTROLLER

(71) Applicant: Purity (Xiamen) Sanitary Ware Co., Ltd., Xiamen, Fujian (CN)

(72) Inventors: James Wu, Taichung (TW); Alex Wu, Taichung (TW); Ce-Wen Yang, Xiamen (CN)

(73) Assignee: PURITY (XIAMEN) SANITARY WARE CO., LTD., Xiamen, Fujian (CN)

(*) Notice: Subject to any disclaimer, the term of this patent is extended or adjusted under 35 U.S.C. 154(b) by 0 days.

(21) Appl. No.: 16/232,433

(22) Filed: Dec. 26, 2018

(65) Prior Publication Data

US 2020/0206760 A1 Jul. 2, 2020

(51) Int. Cl.
*F16K 37/00* (2006.01)
*B05B 1/30* (2006.01)
*B05B 1/16* (2006.01)

(52) U.S. Cl.
CPC .......... *B05B 1/3013* (2013.01); *B05B 1/1654* (2013.01); *Y10T 137/8309* (2015.04)

(58) Field of Classification Search
CPC .............................................. Y10T 137/8309
USPC .............. 138/45, 46; 239/394; 251/206, 208
See application file for complete search history.

(56) References Cited

U.S. PATENT DOCUMENTS

| | | | | |
|---|---|---|---|---|
| 2,132,333 A | * | 10/1938 | Sargent | B05B 1/1654 239/394 |
| 2,790,680 A | * | 4/1957 | Rosholt | B05B 1/1654 239/394 |
| 3,558,061 A | * | 1/1971 | Hansen | A62C 31/03 239/394 |
| 3,596,835 A | * | 8/1971 | Smith | B05B 1/1654 239/394 |
| 4,141,504 A | * | 2/1979 | Anderson | B05B 1/1681 239/394 |
| 6,719,219 B1 | * | 4/2004 | Wang | B05B 1/1654 239/392 |
| 7,281,673 B2 | * | 10/2007 | Burnworth | B05B 1/1636 239/392 |

(Continued)

*Primary Examiner* — Robert K Arundale
(74) *Attorney, Agent, or Firm* — Birch, Stewart, Kolasch & Birch, LLP

(57) ABSTRACT

A flow rate controller includes a pipe body and a control assembly. The pipe body includes a channel, a water supply opening and a water outlet opening, wherein the water supply opening is adapted to connect to a water supply pipe, and the water supply opening communicates with the water outlet opening through the channel. The control assembly includes a fixed member and a rotatable member, wherein the fixed member is fixedly positioned in the pipe body, and includes a first flow hole. The rotatably member is coaxially and rotatably connected to the pipe body, so that the rotatably member is rotatable relative to the pipe body. The rotatably member includes a plurality of second flow holes and a plurality of adjusting positions, wherein the second flow holes have different hole sizes to each other, and each of the adjusting positions is respectively corresponding to the corresponding one of the second flow holes. When the rotatable member rotates to one of the adjusting positions, the corresponding second flow hole overlaps the first flow hole.

19 Claims, 14 Drawing Sheets

(56) References Cited

U.S. PATENT DOCUMENTS

2005/0247901 A1* 11/2005 Wang ..................... F16K 3/08
251/206

* cited by examiner

FLOW RATE CONTROLLER

BACKGROUND OF THE INVENTION

1. Technical Field

The present disclosure relates generally to a controller, and more particularly to a flow rate controller.

2. Description of Related Art

Showers are generally located in baths, which primarily utilize a conventional controller to control the flow output of the shower during use. The conventional controller is usually pulled outwardly to initiate flow and control the strength of flow, thereby causing the water to the desired flow rate with the conventional controller.

Since the conventional controller has merely single outlet flow rate currently, it is unable to provide multiple flow rates in one device while users would like to choose the preferred flow rate.

At least for the above reasons, conventional showers still have room for improvements.

BRIEF SUMMARY OF THE INVENTION

In view of the above, the primary objective of the present disclosure is to provide a flow rate controller, which could accurately adjust a flow rate of a shower facility, and is easy to operate during use.

The present disclosure provides a flow rate controller for adjusting a flow rate of a shower facility. The flow rate controller includes a pipe body and a control assembly. The pipe body includes a channel, a water supply opening and a water outlet opening, wherein the water supply opening is adapted to connect to a water supply pipe, and the water supply opening communicates with the water outlet opening through the channel. The control assembly includes a fixed member and a rotatable member, wherein the fixed member is fixedly positioned in the pipe body, and includes a first flow hole. The rotatably member is coaxially and rotatably connected to the pipe body, so that the rotatably member is rotatable relative to the pipe body. The rotatably member includes a plurality of second flow holes and a plurality of adjusting positions, wherein the second flow holes have different hole sizes to each other, and each of the adjusting positions is respectively corresponding to the corresponding one of the second flow holes. When the rotatable member rotates to one of the adjusting positions, the corresponding second flow hole overlaps the first flow hole.

With the aforementioned design, the rotatable member of the control assembly is rotatable to move the second flow holes having different hole sizes to overlap the first flow hole. Therefore, the flow rate controller provided in the present disclosure could adjust the water flow rate by one hand during use.

BRIEF DESCRIPTION OF THE SEVERAL VIEWS OF THE DRAWINGS

The present disclosure will be best understood by referring to the following detailed description of some illustrative embodiments in conjunction with the accompanying drawings, in which.

DETAILED DESCRIPTION OF THE INVENTION

Figure 1:
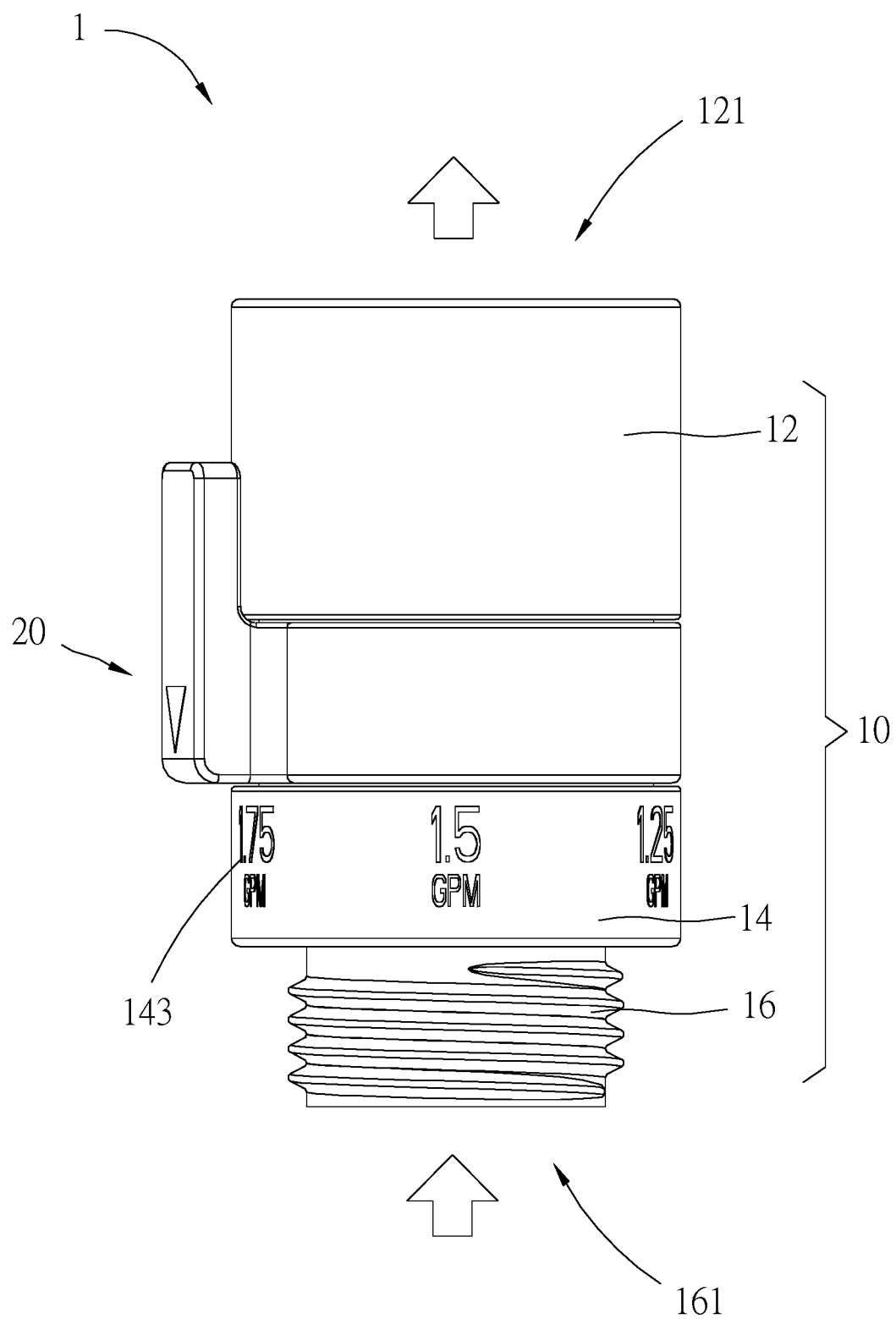
FIG. 1 is a side view of the flow rate controller of one embodiment of the present disclosure.

As illustrated in FIG. 1, a flow rate controller 1 for adjusting a flow rate of a shower facility (not shown) is provided, including a pipe body 10 and a control assembly 20, wherein the pipe body 10 includes a top unit 12 and a bottom unit, and the control assembly 20 is between the top unit 12 and the bottom unit of the pipe body 10. The bottom unit of the pipe body 10 includes an outer sleeve 14 and a water supply connector 16, wherein the outer sleeve 14 is fitted around the water supply connector 16.

In FIG. 1, the pipe body 10 has a channel (not shown), a water supply opening 161 and a water outlet opening 121, wherein the water supply opening 161 communicates with the water outlet opening 121 through the channel. In one embodiment of the present disclosure, the top unit 12 has the water outlet opening 121 and the water supply connector 16 of the bottom unit has the water supply opening 161. The water supply opening 161 is adapted to connect to a water supply pipe (not shown), whereby to supply water into the flow rate controller 1; the water outlet opening 121 is adapted to connect to showers (e.g. a hand shower, a shower head or a water outlet pipe). It is worthy to note that, water flows into the flow rate controller 1 from the water supply opening 161, and flows out of the flow rate controller 1 from the water outlet opening 121; when the control assembly 20 of the flow rate controller 1 is operated, the flow rate of water flowing through the flow rate controller 1 would be adjusted by one user's hand. In other words, it is convenient to adjust the flow rate by operating the flow rate controller 1 during use.

Figure 2A:
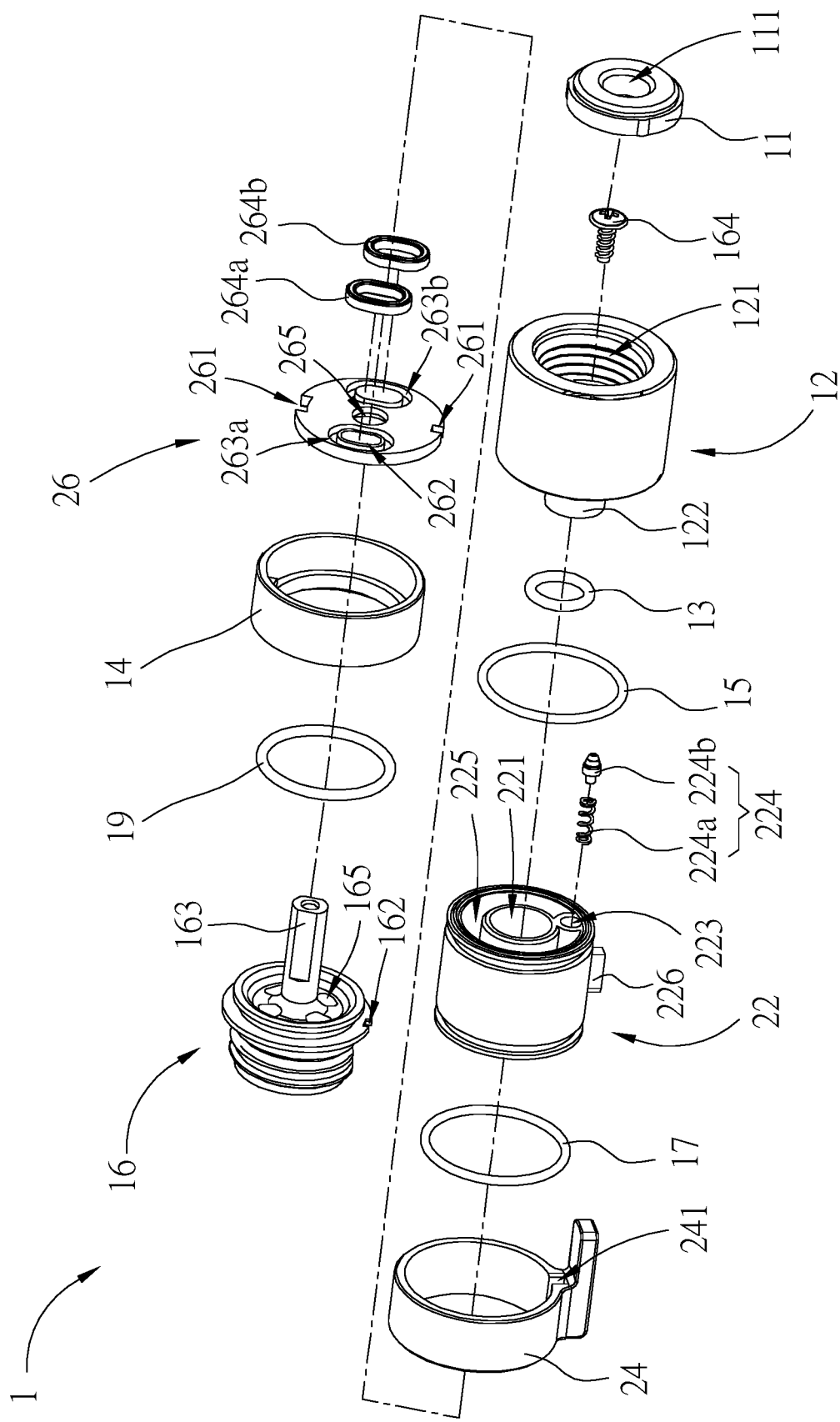
FIG. 2A is an exploded view of the flow rate controller of one embodiment of the present disclosure.
Figure 2B:
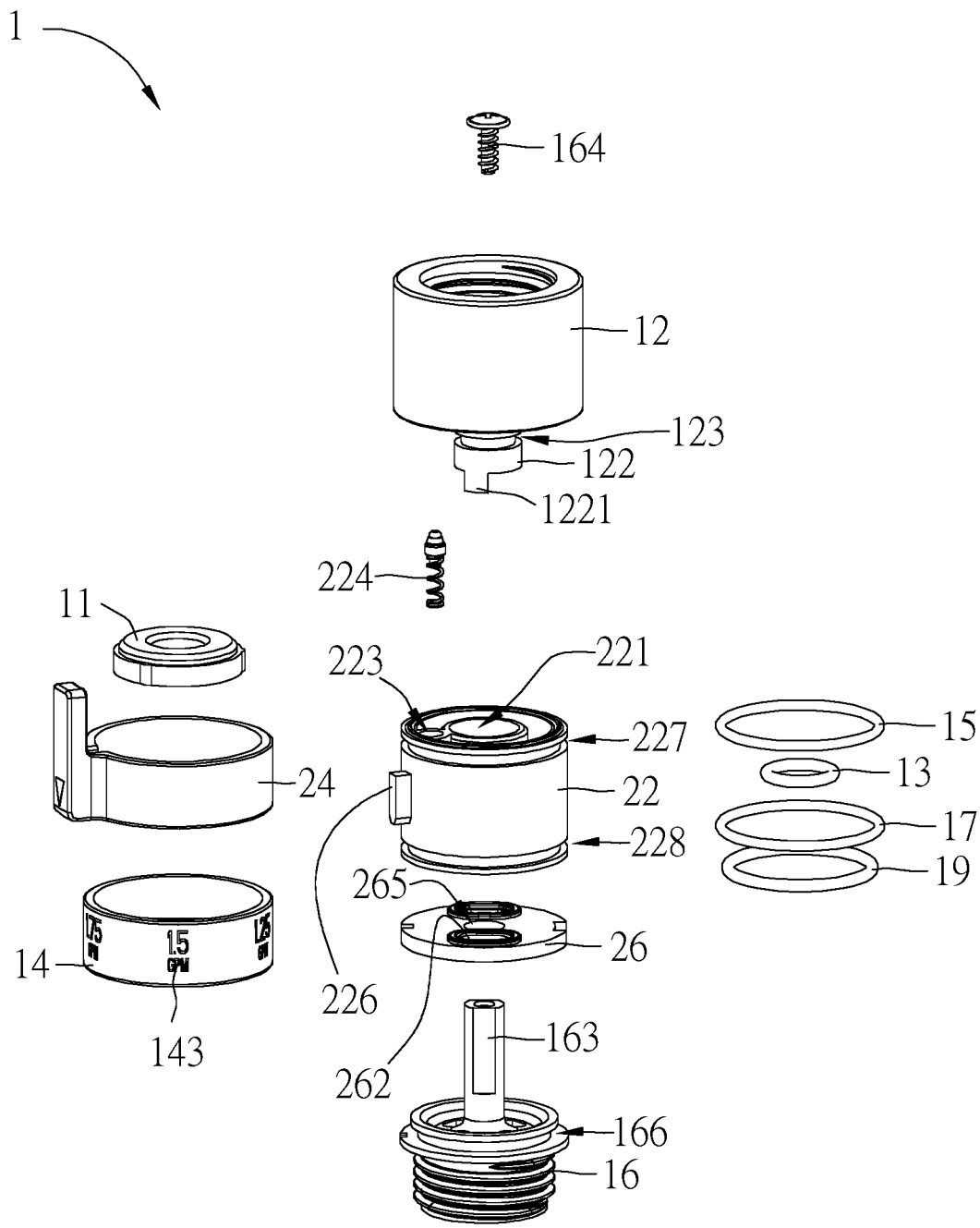
FIG. 2B is a partial exploded view of the flow rate controller of one embodiment of the present disclosure.

FIG. 2A is an exploded view of the flow rate controller of one embodiment of the present disclosure; FIG. 2B is a partial exploded view of the flow rate controller of one embodiment of the present disclosure. The pipe body 10 includes a gasket 11, the top unit 12, a sealing ring 13, the outer sleeve 14, a sealing ring 15, the water supply connector 16, a sealing ring 17 and a sealing ring 19, wherein the gasket 11, the top unit 12, the sealing ring 13, the outer sleeve 14, the sealing ring 15, the water supply connector 16, the sealing ring 17 and the sealing ring 19 are co-axially arranged. The control assembly 20 includes a rotatable member 22, an outer sleeve 24 and a fixed member 26, wherein the rotatable member 22, the outer sleeve 24 and the fixed member 26 are co-axially arranged. Therefore, the aforementioned components of the pipe body 10 and the control assembly 20 are all co-axially arranged.

Figure 7A:
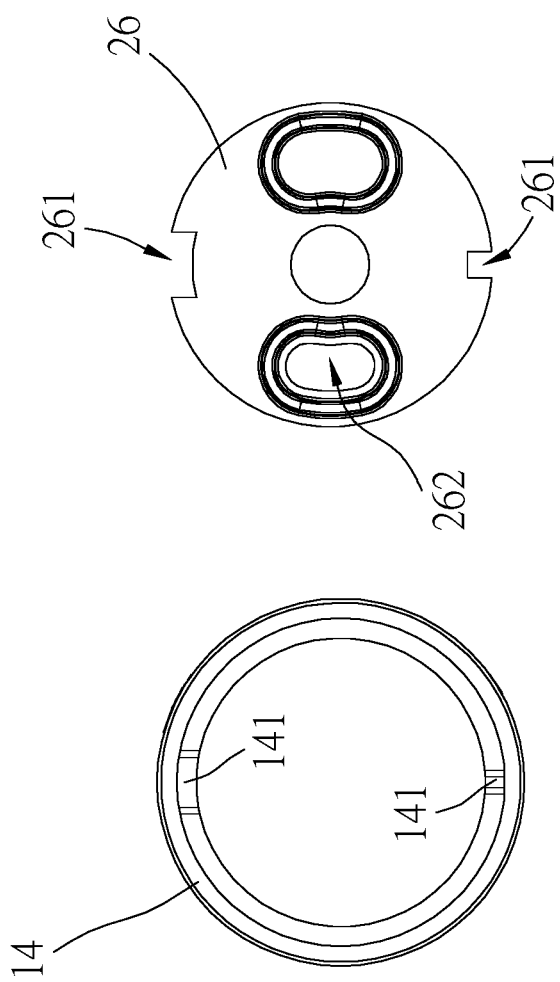
FIG. 7A is a top view of a separation of a fixed member and an outer sleeve of the bottom unit of one embodiment of the present disclosure.
Figure 7B:
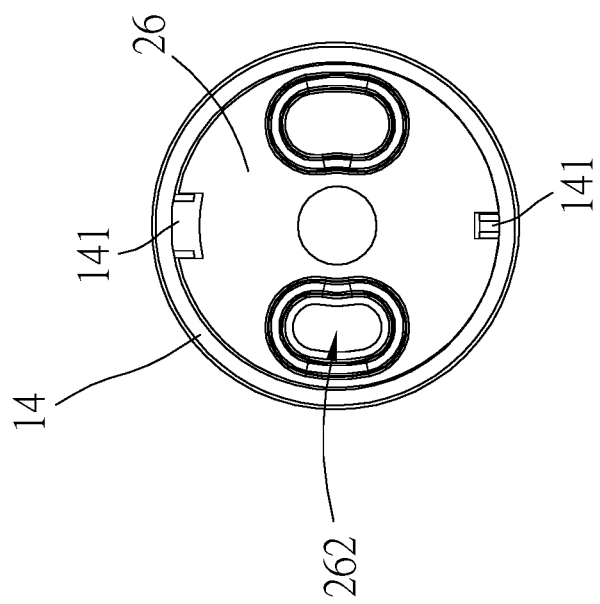
FIG. 7B is a top view of a combination of the fixed member and the outer sleeve of the bottom unit of one embodiment of the present disclosure.

The fixed member 26 is fixedly positioned in the pipe body 10, and includes a first flow hole 262. In FIG. 2A, FIG. 7A and FIG. 7B, the fixed member 26 has two notches 261 recessed into an outer surface of the fixed member 26, and the outer sleeve 14 of the bottom unit has two protrusions 141 protruding inward from an inner surface of a top side of the outer sleeve 14; the protrusions 141 are respectively fitted into the responding one of the notches 261, so that the fixed member 26 could not rotate relative to the outer sleeve 14 of the bottom unit. In practice, the amount of the notch 261 of the fixed member 26 could be one or more than two, and the number of the protrusion 141 of the outer sleeve 14 is the same as the amount of the notch 261.

Figure 8A:
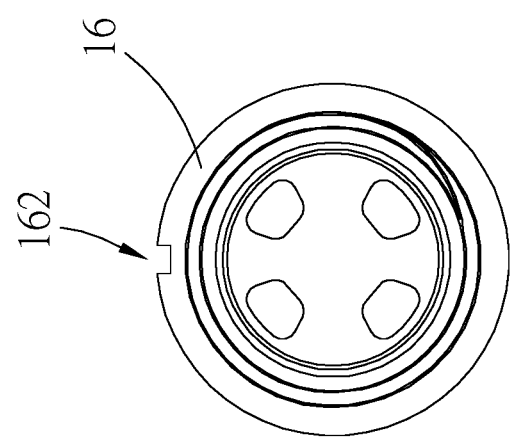
FIG. 8A is a bottom view of a separation of the outer sleeve and the water supply connector of the bottom unit of one embodiment of the present disclosure.
Figure 8A:
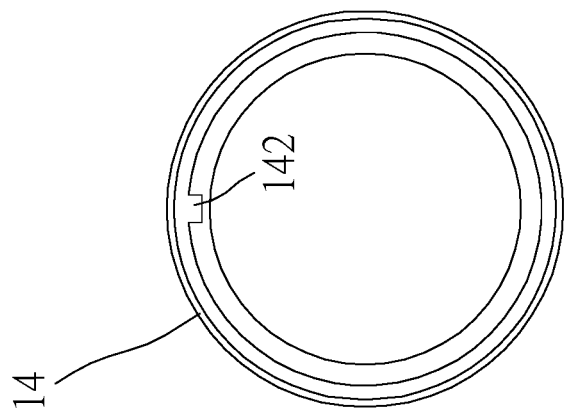
Figure 8B:
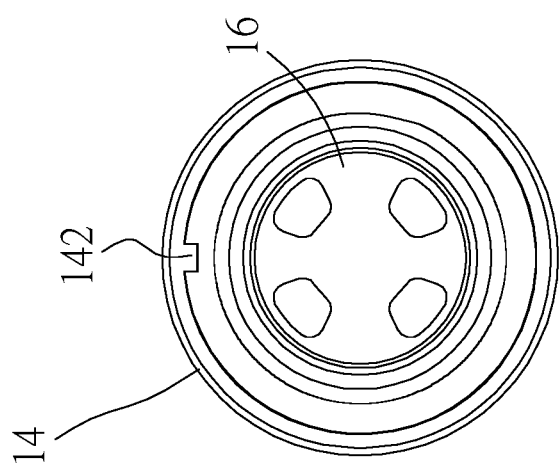
FIG. 8B is a bottom view of a combination of the outer sleeve and the water supply connector of the bottom unit of one embodiment of the present disclosure.

In addition, in FIG. 8A and FIG. 8B, the water supply connector 16 of the bottom unit has one notches 162 recessed into an outer surface of the water supply connector 16, and the outer sleeve 14 of the bottom unit has one protrusion 142 protruding inward from an inner surface of a bottom side of the outer sleeve 14; the protrusion 142 is fitted into the notch 162, so that the outer sleeve 14 could not rotate relative to the water supply connector 16. In practice, the amount of the notch 162 of the water supply connector 16 could be more than one, and the number of the protrusion 142 of the outer sleeve 14 is the same as the amount of the water supply connector 16.

Figure 3:
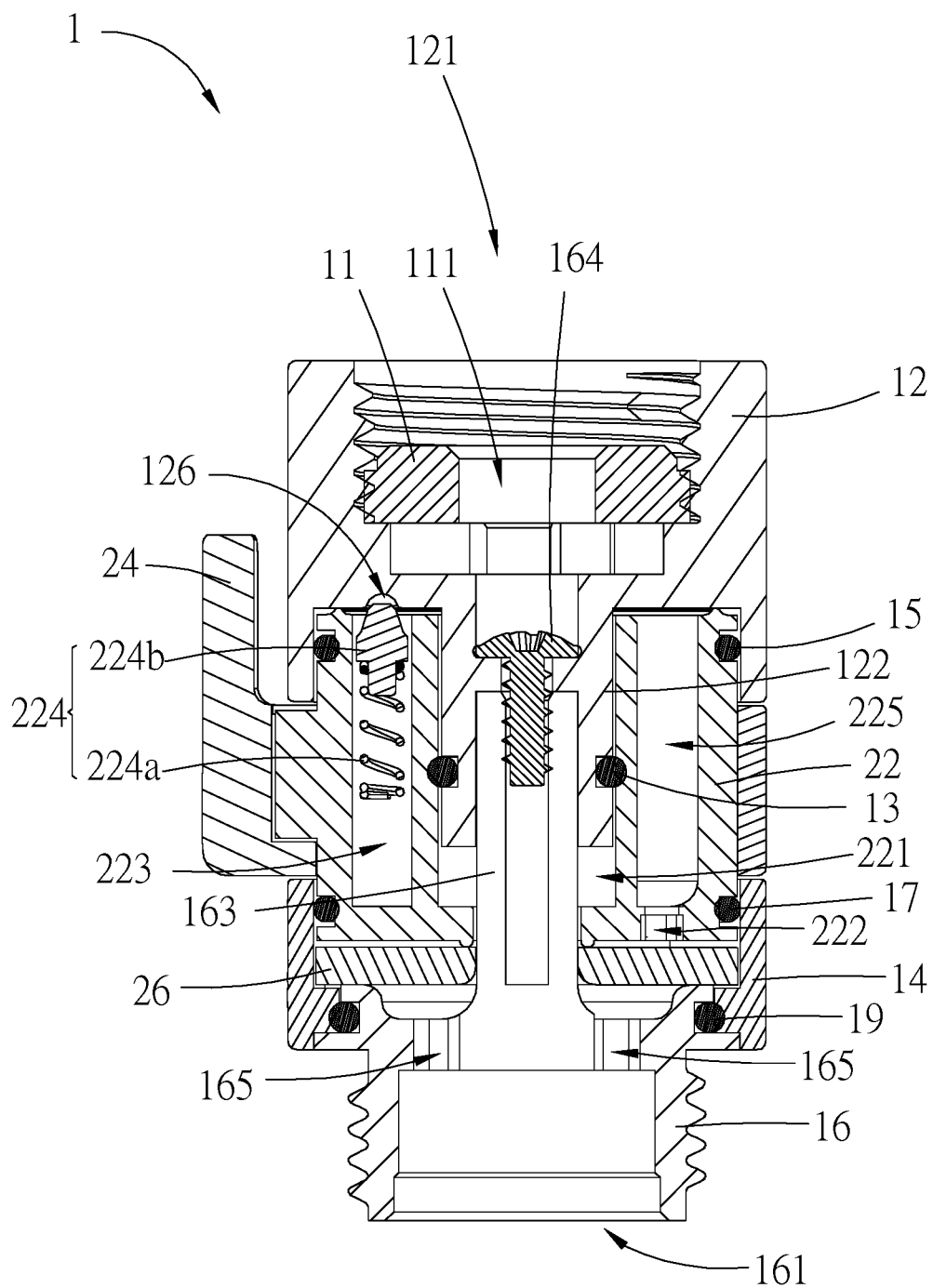
FIG. 3 is a cross-sectional view of the flow rate controller of one embodiment of the present disclosure.
Figure 4:
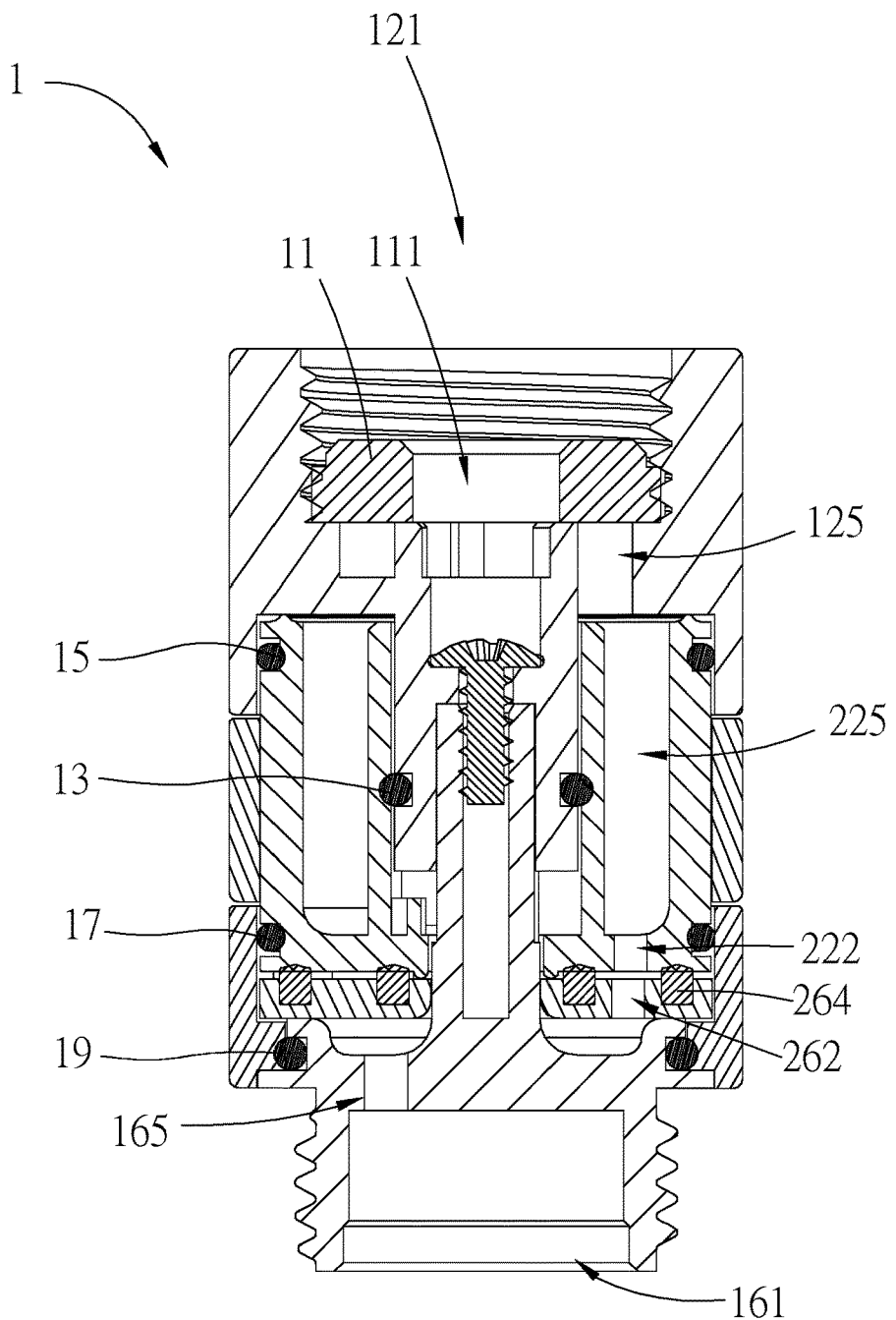
FIG. 4 is another cross-sectional view of the flow rate controller of one embodiment of the present disclosure.
Figure 5:
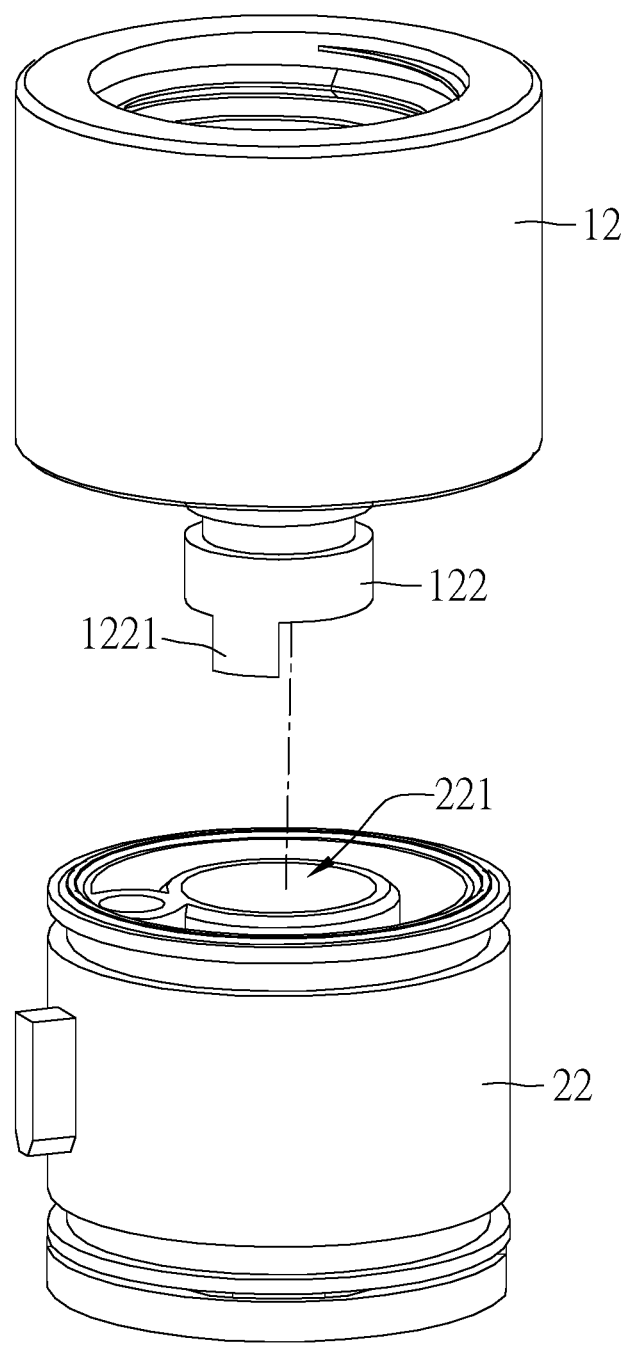
FIG. 5 is a partial exploded view of a top unit and a rotatable member of one embodiment of the present disclosure.
Figure 6:
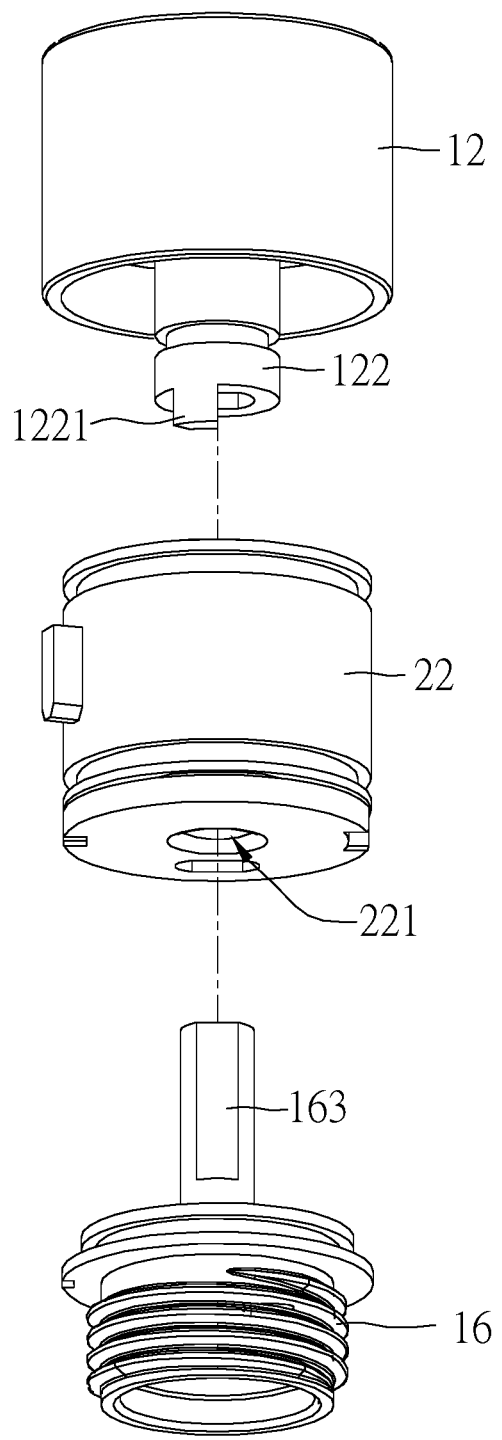
FIG. 6 is a partial exploded view of the rotatable member and a water supply connector of the bottom unit of one embodiment of the present disclosure.

In FIG. 2A and FIG. 2B, the fixed member 26 has a central hole 265, and the water supply connector 16 has a non-circular axis 163; the non-circular axis 163 passes through the central hole 265. It is worthy to note that, the fixed member 26 and the water supply connector 16 could not rotate relative to each other, for both of the fixed member 26 and the water supply connector 16 are fixed by the outer sleeve 14. Besides, the water supply connector 16 has a circular recess 166, in which the sealing ring 19 is positioned to avoid leaking from a gap between the water supply connector 16 and the outer sleeve 14, as shown in FIG. 3 and FIG. 4.

Figure 9:
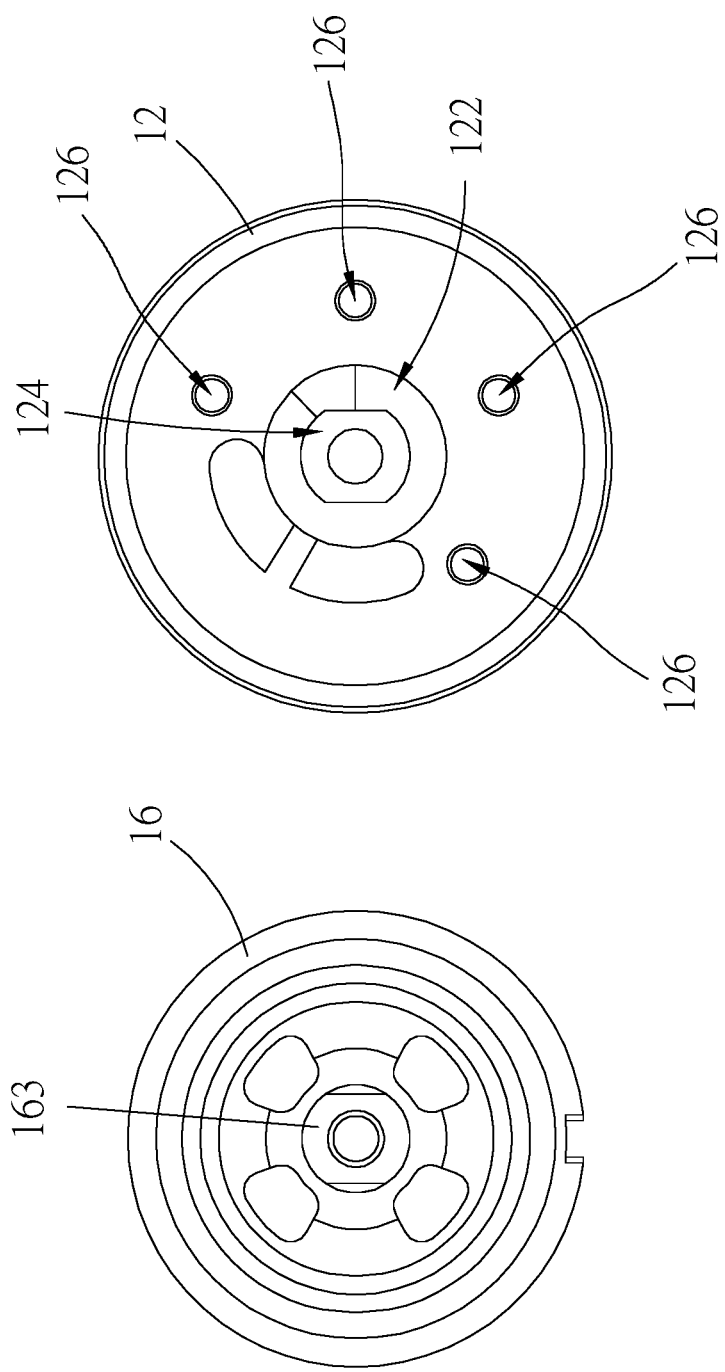
FIG. 9 is a top view of the water supply connector of the bottom unit and a bottom view of the top unit of one embodiment of the present disclosure.
Figure 10:
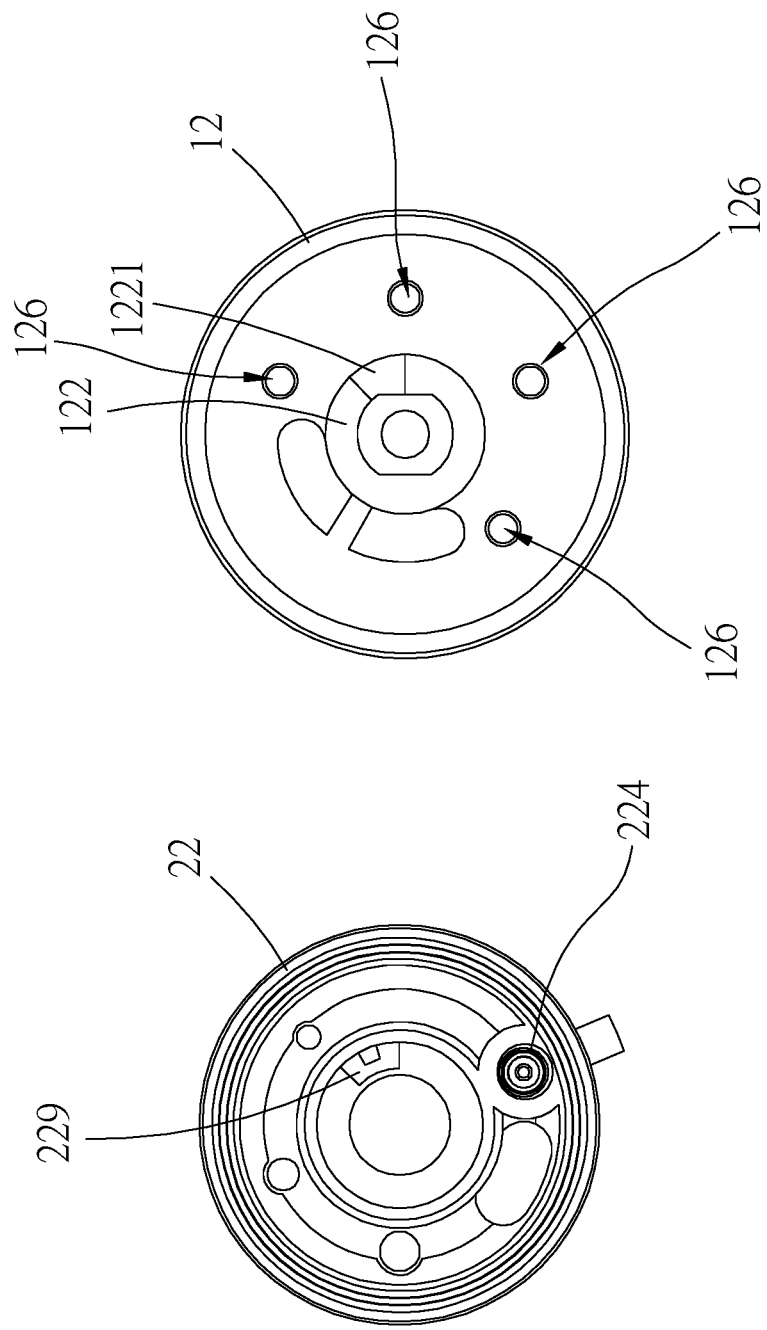
FIG. 10 is a top view of the rotatable member of the control assembly and a bottom view of the top unit of one embodiment of the present disclosure.

Referring to FIG. 9, the top unit 12 includes a non-circular hole 124, which is fitted around the non-circular axis 163 of the water supply connector 16, whereby the top unit 12 could not rotate relative to the water supply connector 16 of the bottom unit. In one embodiment of the present disclosure, the top unit 12 and the water supply connector 16 are fixedly connected by a screw 164.

Referring to FIG. 2A to FIG. 6, the top unit 12 includes a circular post 122, and the non-circular hole 124 is co-axially positioned in the circular post 122; the rotatable member 22 includes a circular hole 221, and the circular hole 221 is fitted around the circular post 122, whereby the rotatable member 22 could rotate relative to the top unit 12. Additionally, the circular hole 221 is also fitted around the non-circular axis 163 of the water supply connector 16, whereby the rotatable member 22 could rotate relative to the water supply connector 16, either. In other words, the rotatable member 22 is co-axially positioned between the top unit 12 and the water supply connector 16 of the pipe body 10, and could rotate relative to the top unit 12 and the water supply connector 16 of the pipe body 10.

The top unit 12 has a circular recess 123 recessed into a surface of the circular post 122; the sealing ring 13 is positioned in the circular recess 123. In other words, the sealing ring 13 is positioned between the circular post 122 and the rotatable member 22, in order to avoid leaking from a gap between the circular post 122 and the rotatable member 22, as shown in FIG. 3 and FIG. 4.

The rotatable member 22 has a top circular recess 227 recessed into a surface of a top side of the rotatable member 22; the sealing ring 15 is positioned in the top circular recess 227. In other words, the sealing ring 15 is positioned between the top unit 12 and the rotatable member 22, in order to avoid leaking from a gap between the top unit 12 and the rotatable member 22, as shown in FIG. 3 and FIG. 4.

The rotatable member 22 has a bottom circular recess 228 recessed into a surface of a bottom side of the rotatable member 22; the sealing ring 17 is positioned in the bottom circular recess 228. In other words, the sealing ring 17 is positioned between the outer sleeve 14 of the bottom unit and the rotatable member 22, in order to avoid leaking from a gap between the outer sleeve 14 of the bottom unit and the rotatable member 22, as shown in FIG. 3 and FIG. 4.

In FIG. 2B, FIG. 3 and FIG. 4, the fixed member 26 is positioned between the rotatable member 22 and the water supply connector 16. The rotatable member 22 has a plurality of second flow holes 222, and the second flow holes 222 have different hole sizes to each other. In one embodiment of the present disclosure, the second flow holes 222 are arranged around a rotating axis of the rotatable member 22. In one embodiment of the present disclosure, the second flow holes 222 are arranged by size, but not limited thereto.

Figure 11:
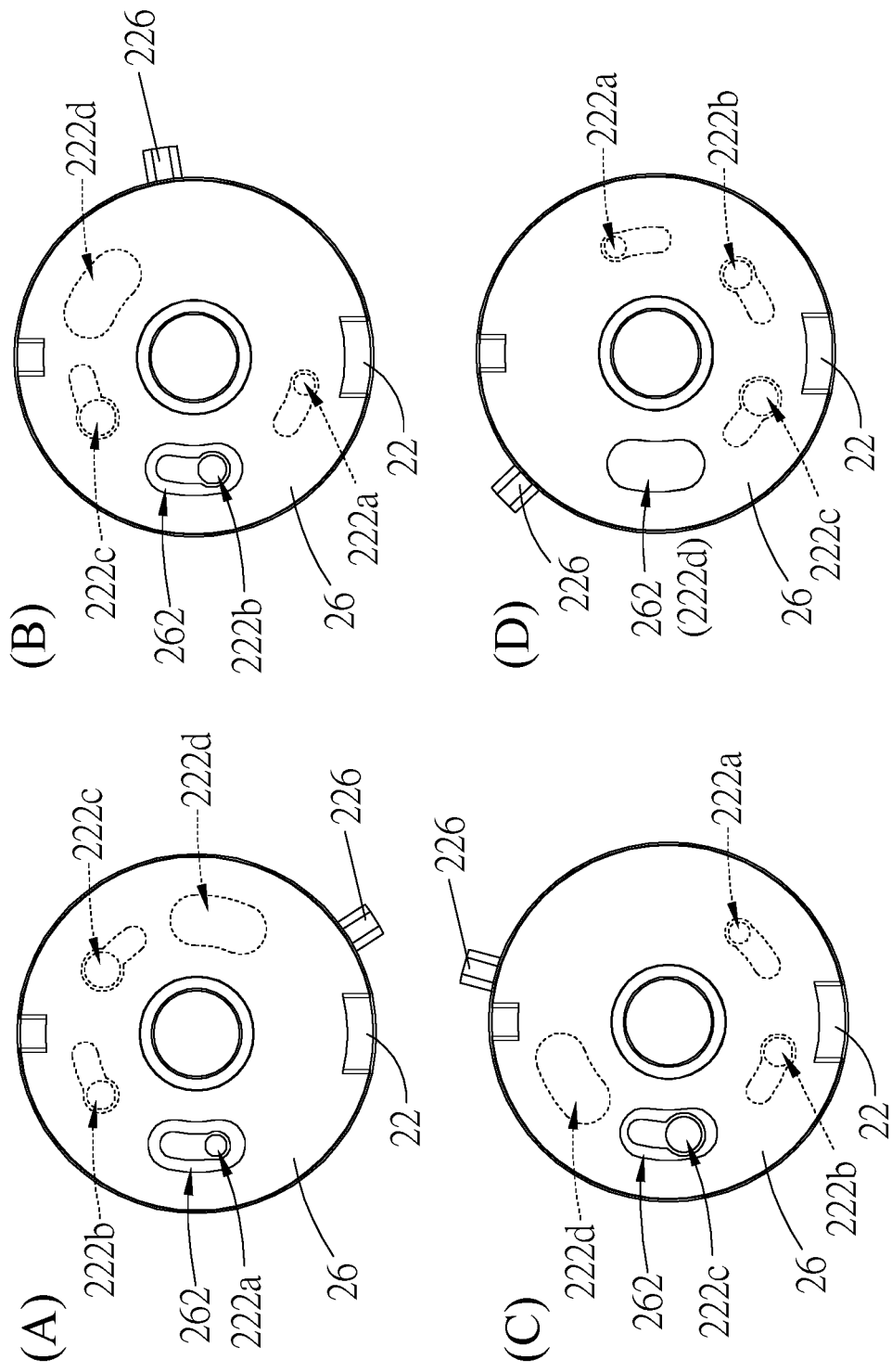
FIG. 11 shows four perspective views of the overlapping of a first flow hole of the fixed member and one of second flow holes of the rotatable member while the rotatable member rotates to stay at one of adjusting positions, according to one embodiment of the present disclosure.

The rotatable member 22 has a plurality of adjusting positions, and each of the adjusting positions is respectively corresponding to the corresponding one of the second flow holes 222. When the rotatable member 22 is operated to rotate to one of the adjusting positions, the corresponding one of the second flow holes 222 is able to overlap the first flow hole 262, as shown in FIG. 4 and FIG. 11. In one embodiment of the present disclosure, the hole size of the first flow hole 262 is greater than that of each of the second flow holes 222. In one embodiment of the present disclosure, the hole size of the first flow hole 262 is equal to that of the greatest one of the second flow holes 222.

In FIG. 4, one of the second flow holes 222 overlaps the first flow hole 262, so that water could flow through the flow rate controller 1. In detail, when one of the second flow holes 222 overlaps the first flow hole 262, water could flow through flow holes 165 of the water supply connector 16, the first flow hole 262 of the fixed member 26, one of the second flow holes 222 of the rotatable member 22, a flow channel 225 of the rotatable member 22, and flow holes 125 of the top unit 12. In one embodiment of the present disclosure, the top unit 12 has a gasket 11 positioned in the water outlet opening 121. The gasket 11 has a third flow hole 111; the hole size of the third flow hole 111 is greater than that of the first flow hole 262 and that of each of the second flow holes 222.

Referring to FIG. 11, in condition (A), when the rotatable member 22 is operated to rotate to a first adjusting position of the adjusting positions, the second flow hole 222a overlaps the first flow hole 262, and the other second flow holes 222b, 222c and 222d are blocked, so that water could merely flow through the second flow hole 222a. Similarly, in condition (B), when the rotatable member 22 is operated to rotate to a second adjusting position of the adjusting positions, the second flow hole 222b overlaps the first flow hole 262, and the other second flow holes 222a, 222c and 222d are blocked, so that water could merely flow through the second flow hole 222b. In condition (C), when the rotatable member 22 is operated to rotate to a third adjusting position of the adjusting positions, the second flow hole 222c overlaps the first flow hole 262, and the other second flow holes 222a, 222b and 222d are blocked, so that water could merely flow through the second flow hole 222c. In condition (D), when the rotatable member 22 is operated to rotate to a fourth adjusting position of the adjusting positions, the second flow hole 222d overlaps the first flow hole 262, and the other second flow holes 222a, 222b and 222c are blocked, so that water could merely flow through the second flow hole 222d. In FIG. 11, the hole sizes of the second flow holes 222a, 222b, 222c and 222d are progressively increased, so that the flow rate in condition (A) is the least than the flow rates in other conditions, and the flow rate in condition (D) is the greatest than the flow rates in other conditions. Alternatively, in condition (A), when the rotatable member 22 is operated to rotate to the first adjusting position, the flow rate of the flow rate controller 1 is the least than in other conditions; in condition (B), when the rotatable member 22 is operated to rotate to the second adjusting position, the flow rate of the flow rate controller 1 is greater than in condition (A); in condition (C), when the rotatable member 22 is operated to rotate to the third adjusting position, the flow rate of the flow rate controller 1 is greater than in condition (B); in condition (D), when the rotatable member 22 is operated to rotate to the fourth adjusting position, the flow rate of the flow rate controller 1 is the greatest than in other conditions.

Referring to FIG. 2A, FIG. 2B, FIG. 3 and FIG. 9, the rotatable member 22 includes an accommodating space 223 and an elastic positioning pin 224. The elastic positioning pin 224 is positioned in the accommodating space 223, and protrudes from an top edge of the rotatable member 22. In one embodiment of the present disclosure, the elastic positioning pin 224 includes a spring 224a and a pin 224b, wherein one end of the spring 224a is connected to the pin 224b, and the other end of the spring 224a is connected to a bottom of the accommodating space 223. The top unit 12 of the pipe body 10 includes a plurality of positioning recesses 126. Each of the positioning recesses 126 is corresponding to the corresponding one of the adjusting positions of the rotatable member 22. When the rotatable member 22 rotates to one of the adjusting positions, the elastic positioning pin 224 goes into the corresponding one of the positioning recesses 126, and the corresponding second flow hole 222 overlaps the first flow hole 262 simultaneously.

It is worthy to note that, when the elastic positioning pin 224 goes into the corresponding positioning recess 126, the attachment of the elastic positioning pin 224 and the corresponding positioning recess 126 would generate a positioning tone to voice that the rotatable member 22 rotates to one of the adjusting positions. The positioning tone is used to remind users that the rotatable member 22 rotates to one of the adjusting positions, and the rib 226 stays at the corresponding adjusting position to indicate the corresponding one of the marks 143, whereby the user could accurately know the flow rate of the water flowing through the flow rate controller 1 by seeing the mark 143 indicated by the rib 226 in conjunction with the accompanying positioning tone.

The outer sleeve 24 is fitted around the rotatable member 22. When the outer sleeve 24 rotates, the outer sleeve 24 could drive the rotatable member 22 to rotate. Specifically, the rotatable member 22 includes a rib 226 protruding from an outer surface of the rotatable member 22; the outer sleeve 24 includes a slot 241 recessed into an inner surface of the outer sleeve 24. The rib 226 is fitted into the slot 241, so that the outer sleeve 24 and the rotatable member 22 could rotate synchronously.

In addition, the outer sleeve 14 of the pipe body 10 has a plurality of marks 143 for respectively illustrating the flow rates of the flow rate controller 1. Each of the adjusting positions is respectively corresponding to the corresponding one of the marks 143. When the rotatable member 22 rotates to one of the adjusting positions, the rib 226 stays to indicate the corresponding mark 143.

Referring FIG. 2A, a first sealing ring 264a is positioned around the first flow hole 262, and is positioned between the fixed member 26 and the rotatable member 22. It is worthy to note that, the fixed member 26 and the rotatable member 22 are attached to the first sealing ring 264a, in order to avoid leaking from a gap between the fixed member 26 and the rotatable member 22. Furthermore, the arrangement of the first sealing ring 264a could increase the stability and reliability of the flow rates of the flow rate controller 1. In one embodiment of the present disclosure, the fixed member 26 includes a first circular recess 263a positioned around the first flow hole 262, and the first sealing ring 264a is positioned in the first circular recess 263a.

Furthermore, in FIG. 2A, a second sealing ring 264b is positioned between the fixed member 26 and the rotatable member 22, wherein the second sealing ring 264b and the first sealing ring 264a are symmetrically arranged on a surface of the fixed member 26, so as to increase the sealing function of the first sealing ring 264a. In practice, the amount of the second sealing ring 264b could be more than one, and the second sealing rings 264b and the first sealing ring 264a are symmetrically arranged on the surface of the fixed member 26. In one embodiment of the present disclosure, the fixed member 26 includes a first circular recess 263a positioned around the first flow hole 262, and the first sealing ring 264a is positioned in the first circular recess 263a. In one embodiment of the present disclosure, the fixed member 26 includes a second circular recess 263b symmetrically arranged relative to the first circular recess 263a, and the second sealing ring 264b is positioned in the second circular recess 263b.

Referring to FIG. 2A, FIG. 2B, FIG. 5, FIG. 10 and FIG. 11, the top unit 12 of the pipe body 10 includes a restricting block 1221 protruding from an outer surface of the circular post 122; the rotatable member 22 includes an abutting block 229 protruding from an inner surface of the circular hole 221. When the rotatable member 22 is operated to rotate, and the abutting block 229 is moved to abut against the restricting block 1221, the rotatable member 22 would stop rotating relative to the top unit 12 of the pipe body 10. Furthermore, when the rotatable member 22 stops rotating relative to the top unit 12 of the pipe body 10, the rotatable member 22 would stay at one of the adjusting positions. Actually, when the rotatable member 22 stops rotating relative to the top unit 12 of the pipe body 10, the rotatable member 22 would stay at the first adjusting position in condition (A), or would stay at the fourth adjusting position in condition (D).

With the aforementioned design, the rotatable member of the control assembly is rotatable to move the second flow holes having different hole sizes to overlap the first flow hole. Therefore, the flow rate controller provided in the present disclosure could adjust the water flow rate by one hand during use.

It must be pointed out that the embodiments described above are only some preferred embodiments of the present disclosure. All equivalent structures which employ the concepts disclosed in this specification and the appended claims should fall within the scope of the present disclosure.

What is claimed is:

1. A flow rate controller for adjusting a flow rate of a shower facility, comprising:
    a pipe body, comprising a channel, a water supply opening and a water outlet opening, wherein the water supply opening is adapted to connect to a water supply pipe, and the water supply opening communicates with the water outlet opening through the channel; and
    a control assembly, comprising a fixed member and a rotatable member, wherein the fixed member is fixedly positioned in the pipe body, and includes a first flow hole; the rotatably member is coaxially and rotatably connected to the pipe body, so that the rotatably member is rotatable relative to the pipe body, and the rotatably member includes a plurality of second flow holes and a plurality of adjusting positions, wherein the second flow holes have different hole sizes to each other, and each of the adjusting positions is respectively corresponding to the corresponding one of the second flow holes; when the rotatable member rotates to one of the adjusting positions, the corresponding second flow hole overlaps the first flow hole;
    wherein the pipe body comprises a top unit having the water outlet opening and a bottom unit having the water supply opening; the top unit comprises a non-circular hole, and the bottom unit comprises a non-circular axis, the non-circular hole is fitted around the non-circular axis, whereby the top unit does not rotate relative to the bottom unit.

2. The flow rate controller of claim 1, wherein the hole size of the first flow hole is greater than that of each of the second flow holes.

3. The flow rate controller of claim 1, wherein the second flow holes are arranged around a rotating axis of the rotatable member.

4. The flow rate controller of claim 3, wherein the second flow holes are arranged by size.

5. The flow rate controller of claim 1, further comprising a sealing ring positioned between the rotatable member and the top unit, and another sealing ring positioned between the rotatable member and the bottom unit.

6. The flow rate controller of claim 1, wherein the top unit comprises a circular post, and the non-circular hole is axially positioned in the circular post; the rotatable member comprises a circular hole, and the circular hole is fitted around the circular post, whereby the rotatable member rotates relative to the top unit.

7. The flow rate controller of claim 1, wherein the bottom unit has a protrusion protruding inward from an inner surface of the bottom unit, and the fixed member comprises a notch recessed into an outer surface of the fixed member; the protrusion is fitted into the notch, so that the fixed member does not rotate relative to the bottom unit.

8. The flow rate controller of claim 1, wherein the top unit has a gasket positioned in the water outlet opening, the gasket has a third flow hole; the hole size of the third flow hole is greater than that of the first flow hole and that of each of the second flow holes.

9. The flow rate controller of claim 1, wherein the pipe body comprises a restricting block, and the rotatable member comprises an abutting block; when the abutting block abuts against the restricting block, the rotatable member stops rotating relative to the pipe body.

10. The flow rate controller of claim 9, wherein when the rotatable member stops rotating relative to the pipe body, the rotatable member stays at one of the adjusting positions.

11. The flow rate controller of claim 1, further comprising a first sealing ring positioned between the fixed member and the rotatable member, wherein the first sealing ring is positioned around the first flow hole.

12. The flow rate controller of claim 11, wherein the fixed member and the rotatable member are attached to the first sealing ring.

13. The flow rate controller of claim 1, further comprising an outer sleeve fitted around the rotatable member, when the outer sleeve rotates, the outer sleeve drives the rotatable member to rotate.

14. The flow rate controller of claim 13, wherein the rotatable member comprises a rib protruding from an outer surface of the rotatable member, the outer sleeve comprises a slot recessed into an inner surface of the outer sleeve; the rib is correspondingly fitted into the slot, so that the outer sleeve and the rotatable member rotate synchronously.

15. The flow rate controller of claim 14, wherein the pipe body has a plurality of marks for respectively illustrating the flow rates of the flow rate controller, each of the adjusting positions is respectively corresponding to the corresponding one of the marks; when the rotatable member rotates to one of the adjusting positions, the rib stays to indicate the corresponding mark.

16. A flow rate controller for adjusting a flow rate of a shower facility, comprising:
    a pipe body, comprising a channel, a water supply opening and a water outlet opening, wherein the water supply opening is adapted to connect to a water supply pipe, and the water supply opening communicates with the water outlet opening through the channel; and
    a control assembly, comprising a fixed member and a rotatable member, wherein the fixed member is fixedly positioned in the pipe body, and includes a first flow hole; the rotatably member is coaxially and rotatably connected to the pipe body, so that the rotatably member is rotatable relative to the pipe body, and the rotatably member includes a plurality of second flow holes and a plurality of adjusting positions, wherein the second flow holes have different hole sizes to each other, and each of the adjusting positions is respectively corresponding to the corresponding one of the second flow holes; when the rotatable member rotates to one of the adjusting positions, the corresponding second flow hole overlaps the first flow hole;
    wherein the rotatable member comprises an elastic positioning pin, and pipe body comprises a plurality of positioning recesses; each of the positioning recesses is corresponding to the corresponding one of the adjusting positions of the rotatable member; when the rotatable member rotates to one of the adjusting positions, the elastic positioning pin goes into the corresponding positioning recess, and the corresponding second flow hole overlaps the first flow hole.

17. The flow rate controller of claim 16, wherein when the elastic positioning pin goes into the corresponding positioning recess, the attachment of the elastic positioning pin and the corresponding positioning recess generate a positioning tone to voice that the rotatable member rotates to one of the adjusting positions.

18. A flow rate controller for adjusting a flow rate of a shower facility, comprising:
 a pipe body, comprising a channel, a water supply opening and a water outlet opening, wherein the water supply opening is adapted to connect to a water supply pipe, and the water supply opening communicates with the water outlet opening through the channel;
 a control assembly, comprising a fixed member and a rotatable member, wherein the fixed member is fixedly positioned in the pipe body, and includes a first flow hole; the rotatably member is coaxially and rotatably connected to the pipe body, so that the rotatably member is rotatable relative to the pipe body, and the rotatably member includes a plurality of second flow holes and a plurality of adjusting positions, wherein the second flow holes have different hole sizes to each other, and each of the adjusting positions is respectively corresponding to the corresponding one of the second flow holes; when the rotatable member rotates to one of the adjusting positions, the corresponding second flow hole overlaps the first flow hole; and
 a first sealing ring positioned between the fixed member and the rotatable member, the first sealing ring positioned around the first flow hole;
 wherein the fixed member comprises a first circular recess positioned around the first flow hole, and the first sealing ring is position in the first circular recess.

19. A flow rate controller for adjusting a flow rate of a shower facility, comprising:
 a pipe body, comprising a channel, a water supply opening and a water outlet opening, wherein the water supply opening is adapted to connect to a water supply pipe, and the water supply opening communicates with the water outlet opening through the channel;
 a control assembly, comprising a fixed member and a rotatable member, wherein the fixed member is fixedly positioned in the pipe body, and includes a first flow hole; the rotatably member is coaxially and rotatably connected to the pipe body, so that the rotatably member is rotatable relative to the pipe body, and the rotatably member includes a plurality of second flow holes and a plurality of adjusting positions, wherein the second flow holes have different hole sizes to each other, and each of the adjusting positions is respectively corresponding to the corresponding one of the second flow holes; when the rotatable member rotates to one of the adjusting positions, the corresponding second flow hole overlaps the first flow hole;
 a first sealing ring positioned between the fixed member and the rotatable member, the first sealing ring positioned around the first flow hole; and
 at least one second sealing ring positioned between the fixed member and the rotatable member, wherein the at least one second sealing ring and the first sealing ring are symmetrically arranged on a surface of the fixed member.

* * * * *